US012717648B2

(12) United States Patent
Aronovich

(10) Patent No.: US 12,717,648 B2
(45) Date of Patent: Aug. 25, 2026

(54) GLOBAL VERTICAL AUTO-SCALING FOR APPLICATION CONTAINERS

(71) Applicant: International Business Machines Corporation, Armonk, NY (US)

(72) Inventor: Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 18/299,260

(22) Filed: Apr. 12, 2023

(65) Prior Publication Data

US 2024/0345896 A1 Oct. 17, 2024

(51) Int. Cl.
*G06F 9/46* (2006.01)
*G06F 9/50* (2006.01)

(52) U.S. Cl.
CPC .... *G06F 9/5077* (2013.01); *G06F 2209/5019* (2013.01); *G06F 2209/503* (2013.01)

(58) Field of Classification Search
CPC ...... G06F 9/5077; G06F 9/5022; G06F 9/505; G06F 9/485; G06F 2209/5019; G06F 2209/503; G06F 2209/5014; G06F 2209/5022; G06F 2209/508; G06F 2209/5021
See application file for complete search history.

(56) References Cited

U.S. PATENT DOCUMENTS 8,495,221 B1 * 7/2013 Tsunoda .................. H04L 67/60 711/170
8,875,150 B2 10/2014 Ferdous
9,424,094 B2 * 8/2016 Cardosa ................ G06F 9/5094
(Continued)

FOREIGN PATENT DOCUMENTS

| | | | |
|---|---|---|---|
| CN | 111327655 | A | 6/2020 |
| CN | 113971068 | A | 1/2022 |
| WO | 2022016808 | A1 | 1/2022 |

OTHER PUBLICATIONS

"Resource Management for Pods and Containers", Kubernetes, last modified Aug. 29, 2022, 11 pages, <https://kubernetes.io/docs/concepts/configuration/manage-resources-containers/>.
"Vertical Pod Autoscaler", printed on Nov. 8, 2022, Github,, Kubernetes, 8 pages, <https://github.com/kubernetes/design-proposals-archive/blob/main/autoscaling/vertical-pod-autoscaler.md>.
(Continued)

*Primary Examiner* — April Y Blair
*Assistant Examiner* — Zhi Chen
(74) *Attorney, Agent, or Firm* — Scott Dobson

(57) ABSTRACT

A computer-implemented method, a computer program product, and a computer system for global vertical auto-scaling for processing units. A computer periodically learns one or more functions, based on resource consumption metrics samples of processing units. A computer uses the one or more functions to obtain a predicted maximal resource consumption value per resource and a predicted minimal resource consumption value per resource for a processing unit. A computer determines a global priority of the processing unit. A computer calculate a prioritized predicted consumption value per resource for the processing unit, based on the global priority, the predicted maximal resource consumption value, and the predicted minimal resource consumption value. A computer uses the prioritized predicted consumption value for vertical auto-scaling of the processing unit by a processing unit management system.

20 Claims, 7 Drawing Sheets

(56) References Cited

U.S. PATENT DOCUMENTS

| | | | | |
|---|---|---|---|---|
| 9,612,878 | B2 | 4/2017 | Di Balsamo | |
| 10,031,785 | B2 | 7/2018 | Gonzalez | |
| 10,481,794 | B1 * | 11/2019 | Castelli | G06F 3/0653 |
| 2007/0041384 | A1 * | 2/2007 | Das | H04Q 11/0067 370/395.4 |
| 2015/0199218 | A1 | 7/2015 | Wilson | |
| 2017/0195410 | A1 * | 7/2017 | Sebbah | H04L 67/1095 |
| 2021/0294658 | A1 | 9/2021 | Gonzalez | |
| 2022/0035668 | A1 * | 2/2022 | de Capoa | G06F 9/505 |
| 2022/0360539 | A1 * | 11/2022 | Chen | H04L 41/082 |
| 2023/0071281 | A1 * | 3/2023 | Tariq | H04L 43/0882 |
| 2023/0153142 | A1 * | 5/2023 | Shabah | G06F 9/4881 718/1 |
| 2024/0241978 | A1 * | 7/2024 | Chopra | G06F 21/6218 |

OTHER PUBLICATIONS

"Vertical Pod Autoscaling", Kubernetes, Github, last updated Oct. 12, 2022, 10 pages, <https://github.com/kubernetes/design-proposals-archive/blob/main/autoscaling/vertical-pod-autoscaler.md>.

Ibm, "IBM Turbonomic Application Resource Management", printed on Nov. 8, 2022, 12 pages, <https://www.ibm.com/products/turbonomic>.

Kgrygiel et al., "Vertical Pod Autoscaler", Kubernetes / design-proposals-archive, printed on Nov. 8, 2022, 18 pages, <https://github.com/kubernetes/design-proposals-archive/blob/main/autoscaling/vertical-pod-autoscaler.md>.

Berral et al., "Theta-Scan: Leveraging Behavior-Driven Forecasting for Vertical Auto-Scaling in Container Cloud", https://ieeexplore.ieee.org/document/9582179, Sep. 2021, 6 pages.

* cited by examiner

GLOBAL VERTICAL AUTO-SCALING FOR APPLICATION CONTAINERS

BACKGROUND

The present invention relates generally to application container management, and more particularly to global vertical auto-scaling for application containers.

Currently in container management systems, the resource requirements (for scheduling calculations) and the resource consumption limits (for enforcement) for a container are typically specified manually. The most common resources to specify are CPU (central processing unit), memory, and storage space. Recent vertical auto-scalers enable automatic scaling of these values based on observed resource consumption. However, existing vertical auto-scaling capabilities have limitations that should be addressed.

SUMMARY

In one aspect, a computer-implemented method for global vertical auto-scaling for processing units is provided. The computer-implemented method includes periodically learning one or more functions, based on resource consumption metrics samples of processing units. The computer-implemented method further includes using the one or more functions to obtain a predicted maximal resource consumption value per resource and a predicted minimal resource consumption value per resource for a processing unit. The computer-implemented method further includes determining a global priority of the processing unit, wherein the global priority determines a rank of the processing unit in an order of precedence for getting resources. The computer-implemented method further includes calculating a prioritized predicted consumption value per resource for the processing unit, based on the global priority, the predicted maximal resource consumption value, and the predicted minimal resource consumption value. The computer-implemented method further includes using the prioritized predicted consumption value for vertical auto-scaling of the processing unit by a processing unit management system.

In another aspect, a computer program product for global vertical auto-scaling for processing units is provided. The computer program product comprises a computer readable storage medium having program instructions embodied therewith, and the program instructions are executable by one or more processors. The program instructions are executable to: periodically learn one or more functions, based on resource consumption metrics samples of processing units; use the one or more functions to obtain a predicted maximal resource consumption value per resource and a predicted minimal resource consumption value per resource for a processing unit; determine a global priority of the processing unit, wherein the global priority determines a rank of the processing unit in an order of precedence for getting resources; calculate a prioritized predicted consumption value per resource for the processing unit, based on the global priority, the predicted maximal resource consumption value, and the predicted minimal resource consumption value; and use the prioritized predicted consumption value for vertical auto-scaling of the processing unit by a processing unit management system.

In yet another aspect, a computer system for global vertical auto-scaling for processing units is provided. The computer system comprises one or more processors, one or more computer readable tangible storage devices, and program instructions stored on at least one of the one or more computer readable tangible storage devices for execution by at least one of the one or more processors. The program instructions are executable to periodically learn one or more functions, based on resource consumption metrics samples of processing units. The program instructions are further executable to use the one or more functions to obtain a predicted maximal resource consumption value per resource and a predicted minimal resource consumption value per resource for a processing unit. The program instructions are further executable to determine a global priority of the processing unit, wherein the global priority determines a rank of the processing unit in an order of precedence for getting resources. The program instructions are further executable to calculate a prioritized predicted consumption value per resource for the processing unit, based on the global priority, the predicted maximal resource consumption value, and the predicted minimal resource consumption value. The program instructions are further executable to use the prioritized predicted consumption value for vertical auto-scaling of the processing unit by a processing unit management system.

DETAILED DESCRIPTION

Figure 1:
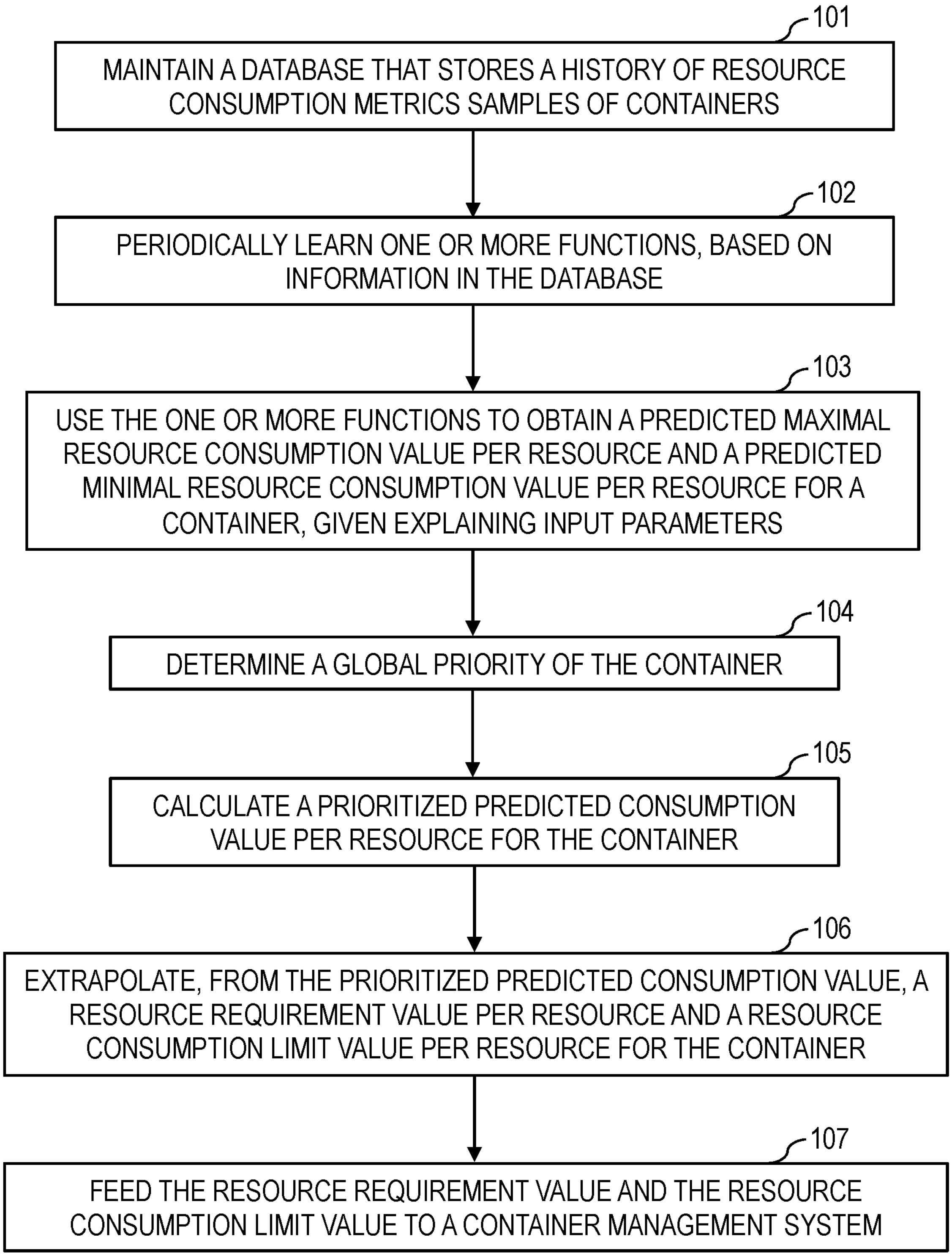
FIG. 1 is a flowchart showing operational steps of predicting and tuning resource requirements and resource consumption limits for a container, in accordance with one embodiment of the present invention.

The limitations in the existing vertical auto-scaling capabilities include the following. (1) Many applications can be throttled and operate well using resource amounts which are in a range between a minimum (i.e., if resource availability is lower than the minimum the application cannot work) and a maximum (i.e., if resource availability is above the maximum there is no significant increase in throughput). Existing vertical auto-scalers do not consider the throttling option and do not tune their recommendation in a feasible range. This reduces the efficiency of the overall resource utilization in a cluster. Existing vertical auto-scalers use a range only for enforcement, namely for triggering eviction and restart of containers; however, the range is not considered for tuning the values recommended by the existing vertical auto-scalers. (2) The values recommended by the existing vertical auto-scalers per resource per container are calculated by considering only a container itself. The existing vertical auto-scalers do not consider any information regarding other containers or any global information. For examples, priorities of containers can be important for tuning recommendations by the existing vertical auto-scalers; however, these priorities are not considered by the existing vertical auto-scalers. (3) Determining recommended values by the existing vertical auto-scalers is done using simplified methods, that typically look only at the consumption values but do not look at explaining parameters and environmental parameters. Some references about estimating resource usage use a single aspect as basis for the estimation (e.g., data input to the application). However, existing vertical auto-scalers do not use a machine learning method that considers a multitude of explaining parameters and environmental parameters to determine recommended values. (4) The existing vertical auto-scalers do not consider smoothness in refinement of resource requirements over time. (5) The existing vertical auto-scalers handle containers over consumption events without any condition or differentiation with regards to whether the container's resource requirement and limit values are stable or not yet stable. Applying the same method for containers whose values are not yet stable can cause significant performance degradation.

Embodiments of the present invention address the above-mentioned limitations and therefore increase performance of applications and the overall resource utilization efficiency.

Embodiments of the present invention can be implemented in any containers management system, in any cloud platform (such as container, virtual machine, or any other type), and in any workload or job management system. While the term "container" is used in describing the present invention, the present invention can be applied to any type of processing units, for example, threads, processes, applications, jobs, pods, operating system instances, virtual machines, hosts, clusters, etc.

In the present invention, a method uses explaining parameters to predict ranges of resource requirements and limits for a container. The explaining parameters capture both the image type and the environment in which the container works (i.e., time, placement, network traffic, and storage input/output rates). The method uses machine learning to learn functions that predict resource consumption ranges based on the explaining parameters. Existing vertical auto-scalers use simplified methods, which typically look only at consumption values, do not look at explaining and environmental parameters, do not produce consumption ranges, and do not use machine learning. No current vertical auto-scaler uses the comprehensive machine learning design, including the explaining and environmental parameters and the output of consumption ranges.

In the present invention, a method is proposed for tuning the consumption predicted by a vertical auto-scaler in a feasible range for a container, by considering global containers' priorities in conjunction with predicted consumption ranges. Containers with higher priorities are tuned up on their ranges per resource. Containers with lower priorities are tuned down on their ranges per resource. Adding the priorities across containers to the vertical auto-scaler's calculations adds a global efficiency perspective to the calculations. Existing vertical auto-scalers calculate by considering only the container itself. No existing vertical auto-scaler uses global information for tuning calculated consumption values, and furthermore no existing vertical auto-scale tunes the calculated values in a feasible range per application.

In the present invention, a method is proposed for extrapolating resource requirement and limit values from predicted resource consumptions. In the present invention, a method is proposed for smooth incremental refinement of the resource request and limit values over time. To smooth the changes, current predicted values are combined with existing values that reflect a past period of time, and therefore the proposed method avoids the effect of skewed or outlier samples. No existing vertical auto-scaler provides an approach of incremental and smooth refinement.

In the present invention, a method is proposed for introducing a new container state—a pending stability state, where the resource limits are not yet stable. In the pending stability state, enforcement of limits is soft; in other words, exceeding the limits will not cause eviction or termination of the container. After existing the pending stability state, namely the container reaches a stable state, enforcement of limits becomes hard; in other words, eviction and termination become possible. No existing vertical auto-scaler provides conditional handling of containers over consumption events based on such a container state.

In the present invention, a protocol is proposed for implementation between a system implementing the proposed method and a container for which resource requirement and/or resource limit values are updated (i.e., increased or decreased). The proposed protocol enables safe and efficient handling of these events. No existing vertical auto-scaler specifies this proposed protocol.

The proposed method in the present invention does not require any changes in existing application programming interfaces (APIs) of a scheduling sub-system. The proposed method in the present invention does not require any changes in containers or in applications inside the containers. This is important for keeping backward compatibility and facilitating the implementation of the proposed global vertical auto-scaler of the present invention.

FIG. 1 is a flowchart showing operational steps of predicting and tuning resource requirements and resource consumption limits for a container, in accordance with one embodiment of the present invention. The operational steps of predicting and tuning resource requirements and resource consumption limits for a container are implemented by a computer or server (such as computer 601 in FIG. 6).

In step 101, the computer or server maintains a database that stores a history of resource consumption metrics samples of containers. Each record in the database is a sample of the resource consumption metrics of a specific running container at a specific time. A record may include image instance identification parameters, container runtime parameters, and resource consumption metrics. The image instance identification parameters may include an image global unique ID, an image name and tag, and an image last layer digest. The container runtime parameters may include time parameters and placement parameters. The time parameters indicate when the container is deployed for running, when the resource consumption metrics sample is taken, and the interval of time covered by the resource consumption metrics in the sample. The placement parameters indicate a cluster where the container is deployed and a host where the container is deployed. The resource consumption metrics may include CPU, memory, network rates (in and out), and I/O rates. The resource consumption metrics specify the maximum, minimum, and mean resource consumption per resource for the sampled interval of time. The database may store records for a single cluster or alternatively multiple different clusters by being available from a shared location.

Figure 2:
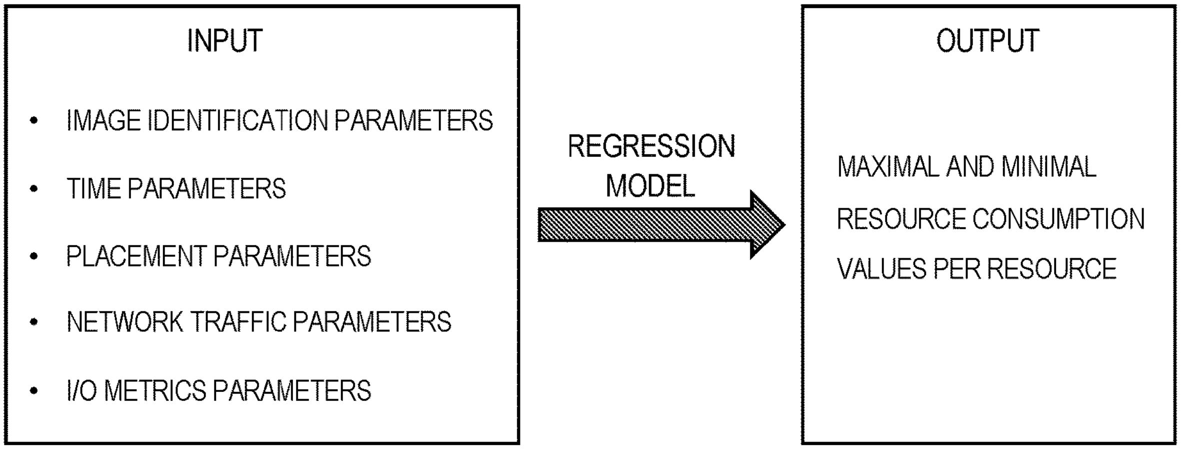
FIG. 2 illustrates learning a function for predicting resource requirements and resource consumption limits for a container, in accordance with one embodiment of the present invention.

In step 102, the computer or server periodically learns one or more functions, based on information in the database. FIG. 2 illustrates an example of learning a function for predicting resource requirements and resource consumption limits for a container, in accordance with one embodiment of the present invention. As shown in FIG. 2, the input for machine learning is explaining parameters, which may include image identification parameters, time parameters, placement parameters, network traffic parameters, and I/O (input/output) metrics parameters. As shown in FIG. 2, the output for machine learning is explained parameters, which may include a maximal resource consumption value per resource and a minimal resource consumption value per resource. The rationale of the one or more functions is as follows. Image instance A behaves and consumes resources in a certain way when used in the environment and context described by time, placement, network traffic, and I/O metrics. The network traffic and I/O metrics can explain the external interaction of the container, which may affect how the container behaves. In the example shown in FIG. 2, the computer or server uses a regression model to learn the one or more functions. In other embodiments, any other models that supports predicting continuous values can be used.

In step 103, the computer or server uses the one or more functions (which has been learned in step 102) to obtain a predicted maximal resource consumption value per resource and a predicted minimal resource consumption value per resource for a container, given the explaining input parameters.

In step 104, the computer or server determines a global priority of the container. The global priority determines a rank of the container in an order of precedence for getting resources. The computer or server determines global priorities for respective ones of pending or running containers. Each container is assigned with a global priority value. A container with a higher global priority value has higher precedence in getting resources relative to a container with a lower global priority value. The global priority values of the plurality of containers are incorporated in resource calculations. The inputs used for the computer or server to determine the global priorities can come from a user, an administrator, or automated information collected by a container management system. The global priorities can be determined dynamically or statically by the computer or server. In addition, the computer or server transforms the priorities to a unified scale of 0 to 1.

In step 105, the computer or server calculates a prioritized predicted consumption value per resource for the container. In this step, the computer or server applies a function $$PrioritizedPrediction[a, x_{max}, x_{min}]$$

where a is the global priority determined in step 104, $x_{max}$ is the predicted maximal resource consumption value obtained in step 103, and $x_{min}$ is the predicted minimal resource consumption value also obtained in step 103. The function is used to calculate the prioritized predicted resource consumption value. For example, the implementation of above function may be $$PrioritizedPrediction[] = \text{MAX}(a \times x_{max}, x_{min}).$$

The computer or server applies the function in which the global priority of the container, the predicted maximal resource consumption value, and the predicted minimal resource consumption value are used as input. From the function, the computer or server produces one prioritized predicted resource consumption value per resource for the container. The computer or server uses the prioritized predicted consumption value for vertical auto-scaling of the processing unit by a processing unit management system.

In step 106, the computer or server extrapolates, from the prioritized predicted consumption value, a resource requirement value per resource and a resource consumption limit value per resource for the container. In the extrapolation, the computer or server uses a function. For example, the resource requirement value is higher than the prioritized predicted consumption value by a predetermined percentage or amount, or is equal to the prioritized predicted consumption value. For example, the resource consumption limit value is higher than the resource requirement value by another predetermined percentage or amount or is equal to the resource requirement value.

The following example shows how the resource requirement value and the resource consumption limit value are obtained from the predicted maximal resource consumption value and the predicted minimal resource consumption value. For a container C and a resource R, using the one or more prediction functions, the computer or server obtains:

$$\text{predicted maximal resource consumption value} = 10$$

$$\text{predicted minimal resource consumption value} = 2$$

The computer or server therefore obtains a range of the predicted resource consumption values; the range is from 2 to 10.

The global priority of the container C relative to other containers is determined as 0.8. The computer or server calculates the prioritized predicted consumption value as follows:

$$\text{prioritized predicted consumption value} = \text{MAX}(0.8 \times 10, 2) = 8$$

In extrapolating the resource requirement value from the prioritized predicted consumption value, the computer or server uses a simple function in which the resource requirement value adds 20% over the prioritized predicted consumption value; in other words, the resource requirement value is 20% higher than the prioritized predicted consumption value. The calculation of the resource requirement value is as follows:

$$\text{resource requirement value} = 8 \times 1.2 = 9.6$$

Alternatively, the resource requirement value is set to be equal to the prioritized predicted consumption value; therefore, $$\text{resource requirement value} = 8$$

In extrapolating the resource consumption limit value, the computer or server uses another simple function in which the resource consumption limit value adds 50% over the resource requirement value; in other words, the resource consumption limit value is 50% higher than the resource requirement value. The calculation of the resource consumption limit value is as follows:

$$\text{resource consumption limit value} = 9.6 \times 1.5 = 14.4$$

In step 107, the computer or server feeds the resource requirement value and the resource consumption limit value to a container management system. The resource requirement value and the resource consumption limit value are obtained in step 106. The resource requirement value is a value that is fed into the containers management system for the corresponding resource and the container. The resource requirement values for different resources are used by the container management system to allocate resources for the container. The resource consumption limit value is a value that is fed into the containers management system for the corresponding resource and the container. The resource limit values for different resources are used by the container management system to determine whether the container exceeds any resource consumption limit value. If the container exceeds any resource consumption limit value, the container management system takes an appropriate action such as evicting or terminating the container.

Figure 3:
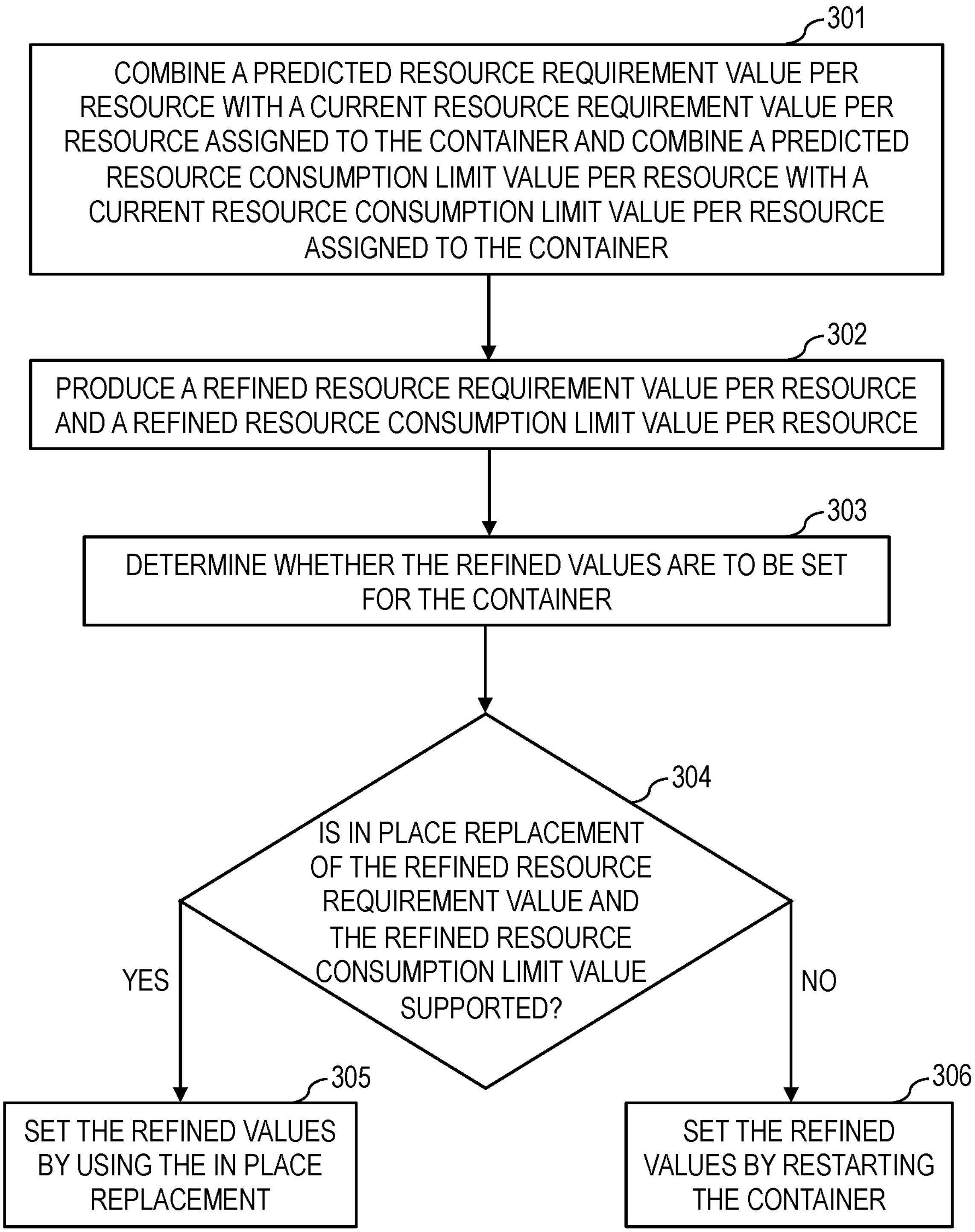
FIG. 3 is a flowchart showing operational steps of updating the resource requirements and limits of a container over time, in accordance with one embodiment of the present invention.

FIG. 3 is a flowchart showing operational steps of updating the resource requirements and limits of a container over time, in accordance with one embodiment of the present invention. In one embodiment, the operational steps of updating the resource requirements and limits of a container over time are implemented by a container management system which is hosted by a computer or server (such as computer 601 in FIG. 6).

Over time, many elements change. For example, the database that stores the history of the resource consumption metrics samples of containers changes (such as new samples are added to the database); the one or more machine learning functions are periodically relearned; the environment parameters and the priorities that affect all the pending and running containers change over time. Therefore, the computer or server updates the resource requirements and limits for each pending and running container periodically.

The goal of the operational steps is to smooth the changes in the resource requirement value per container and the resource consumption limit value per container, avoid sharp changes, and avoid the effect of skewed or outlier samples.

In step 301, the computer or server combines a predicted resource requirement value per resource with a current resource requirement value per resource assigned to the container and combines a predicted resource consumption limit value per resource with a current resource consumption limit value per resource assigned to the container. In step 302, the computer or server produces a refined resource requirement value per resource and a refined resource consumption limit value per resource.

For example, in combining the predicted resource requirement value with the current resource requirement value assigned to the container, the computer or server uses a weight of the predicted resource requirement value and a weight of the current resource requirement value. For example, in combining the predicted resource consumption limit value with the current resource consumption limit value assigned to the container, the computer or server uses a weight of the predicted resource consumption limit value and a weight of the current resource consumption limit value. The weights may depend on at least one of the following: the number of samples used for obtaining the already assigned values (the current resource requirement value and the current resource consumption limit value), the time interval of the already assigned values compared with the time interval of the predicted values (the predicted resource requirement value and the predicted resource consumption limit value), and the difference between the already assigned values and the predicted values. Consider that the already assigned values represent a much larger time interval compared to the predicted values.

In step 303, the computer or server determines whether the refined resource requirement value and the refined resource consumption limit value are to be set for the container. The computer or server uses a criterion for this determination, where the criterion can be based on the difference between the refined values and the already assigned values. In response to determining that the refined values are to be set for the container, in step 304, the computer or server determines whether in place replacement of the refined resource requirement value and the refined resource consumption limit value is supported.

In response to determining that in place replacement is supported (YES branch of decision block 304), in step 305, the computer or server sets the refined resource requirement value and the refined resource consumption limit value by using the in place replacement.

In response to determining that in place replacement is not supported (NO branch of decision block 304), in step 306, the computer or server sets the refined resource requirement value and the refined resource consumption limit value by restarting the container.

Figure 4A:
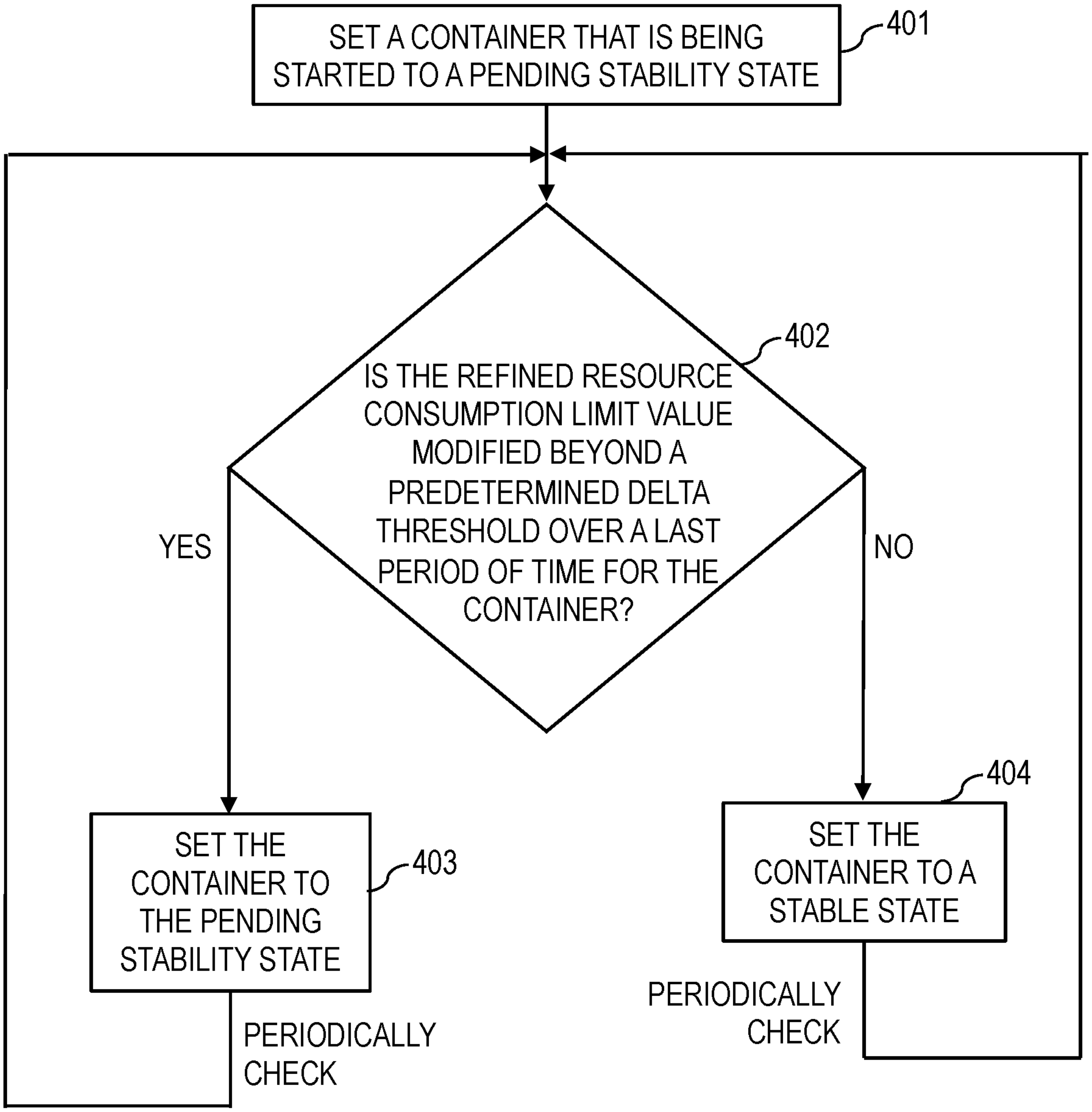
FIG. 4(A) and FIG. 4(B) are flowcharts showing operational steps of conditional handling of containers over consumption events, in accordance with one embodiment of the present invention.
Figure 4B:
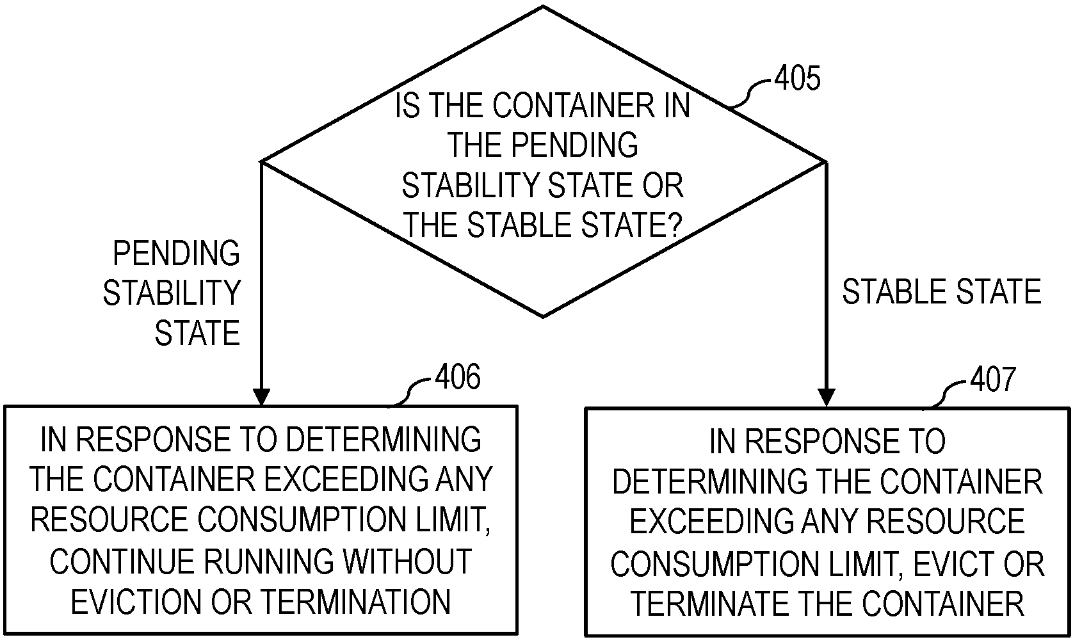

FIG. 4(A) and FIG. 4(B) are flowcharts showing operational steps of conditional handling of containers over consumption events, in accordance with one embodiment of the present invention. In one embodiment, the operational steps of conditional handling of containers over consumption events are implemented by a container management system which is hosted by a computer or server (such as computer 601 in FIG. 6).

Referring to FIG. 4(A), in step 401, the computer or server sets a container that is being started to a pending stability state. In step 402, the computer or server determines whether the refined resource consumption limit value is modified beyond a predetermined delta threshold over a last period of time for the container.

In response to determining the refined resource consumption limit value being modified beyond the predetermined delta threshold (YES branch of decision block 402), in step 403, the computer or server sets the container to the pending stability state. After setting the container to the pending stability state in step 403, the computer or server periodically checks whether the refined resource consumption limit value is modified beyond the predetermined delta threshold; the computer or server will periodically iterate step 402.

In response to determining the refined resource consumption limit value being modified not beyond the predetermined delta threshold (NO branch of decision block 402), in step 404, the computer or server sets the container to a stable state. After setting the container to the stable state in step 404, the computer or server periodically checks whether the refined resource consumption limit value is modified beyond a predetermined delta threshold; the computer or server will periodically iterate step 402.

Referring to FIG. 4(B), in step 405, the computer or server determines whether the container is in the pending stability state or the stable state. In step 406, in response to determining the container being in the pending stability state and in response to determining the container exceeding any of resource consumption limit values for different resources, the computer or server continues running the container without eviction or termination of the container. In step 407, in response to determining the container being in the stable state and in response to determining the container exceeding any of resource consumption limit values for different resources, the computer or server takes an action to evict or terminate the container.

Figure 5:
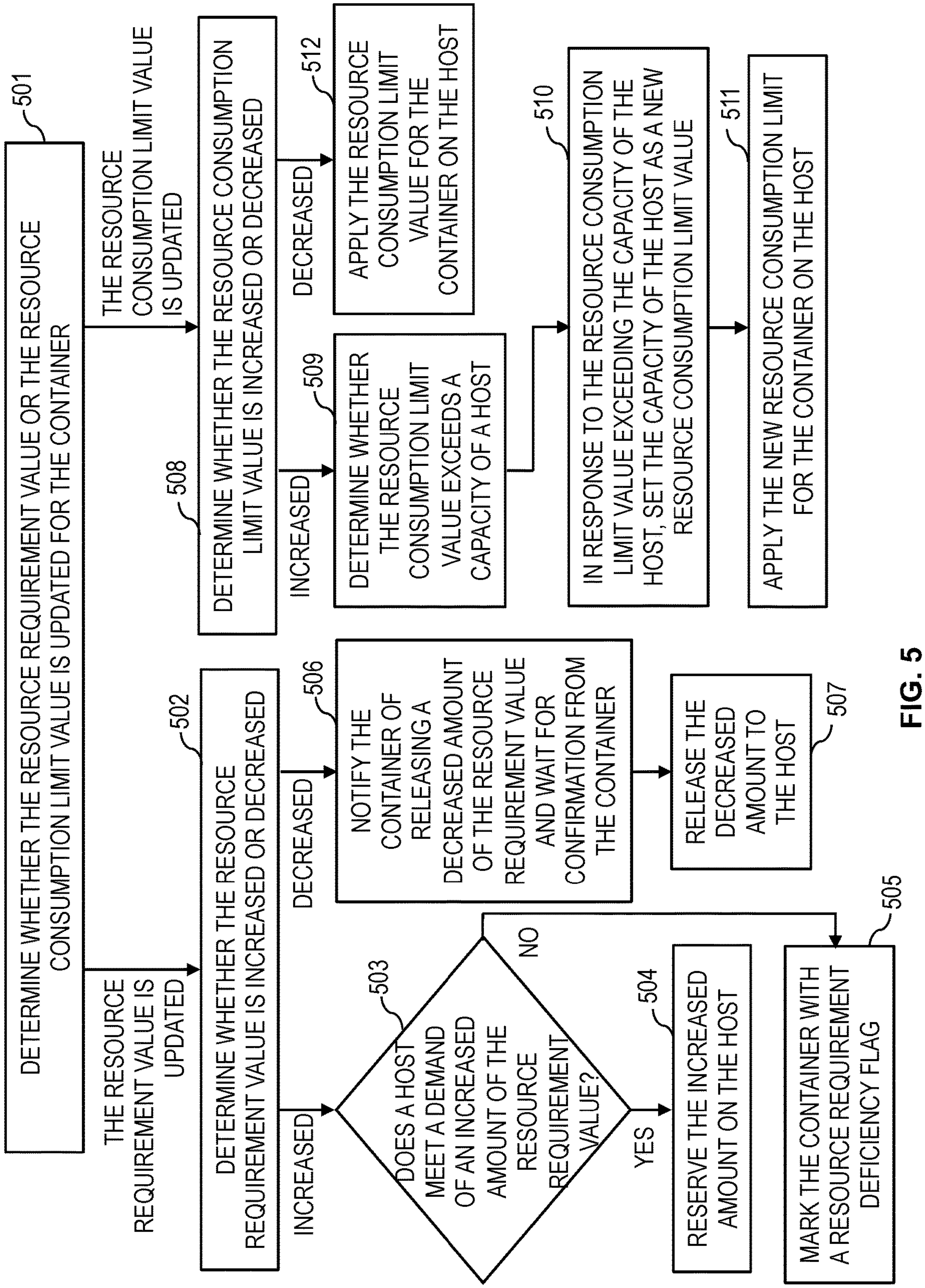
FIG. 5 is a flowchart showing operational steps of handling a container for which resource requirement or resource limit values are updated, in accordance with one embodiment of the present invention.

FIG. 5 is a flowchart showing operational steps of handling a container for which resource requirement or resource limit values are updated, in accordance with one embodiment of the present invention. In one embodiment, the operational steps are implemented by a container management system which is hosted by a computer or server (such as computer 601 in FIG. 6).

In step 501, the computer or server determines whether the resource requirement value or the resource consumption limit value is updated for the container. In response to determining the resource requirement value is updated for the container, in step 502, the computer or server determines whether the resource requirement value is increased or decreased.

Following step 502, in response to determining the resource requirement value being increased, in step 503, the computer or server determines whether a host running the container meets a demand of an increased amount of the resource requirement value. In response to determining the host meeting the demand (YES branch of decision block 503), in step 504, the computer or server reserves the increased amount on the host. In response to determining the host not meeting the demand (NO branch of decision block 503), in step 505, the computer or server marks the container with a resource requirement deficiency flag. For a predetermined time interval in the future, the computer or server attempts to satisfy the demand when any of other containers on the same host completes or is removed. If the predetermined time interval finishes and the deficiency still exists, the computer or server attempts to relocate the container to a host where sufficient resources are available. Upon successful reservation of the increased amount of the resource, the computer or server notifies the container on the successful reservation.

Following step 502, in response to determining the resource requirement value being decreased, in step 506, the computer or server notifies the container of releasing a decreased amount of the resource requirement value and waits for confirmation from the container. In step 507, the computer or server releases the decreased amount to the host.

Following step 501, in response to determining the resource consumption limit value is updated for the container, in step 508, the computer or server determines whether the resource consumption limit value is increased or decreased.

Following step 508, in response to determining the resource consumption limit value being increased, in step 509, the computer or server determines whether the resource consumption limit value exceeds a capacity of a host running the container. In response to determining the resource consumption limit value exceeding the capacity of the host, in step 510, the computer or server sets the capacity of the host as a new resource consumption limit value. In step 511, the computer or server applies the new resource consumption limit value for the container on the host. In response to determining the resource consumption limit value being decreased, in step 512, the computer or server applies the resource consumption limit value for the container on the host.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
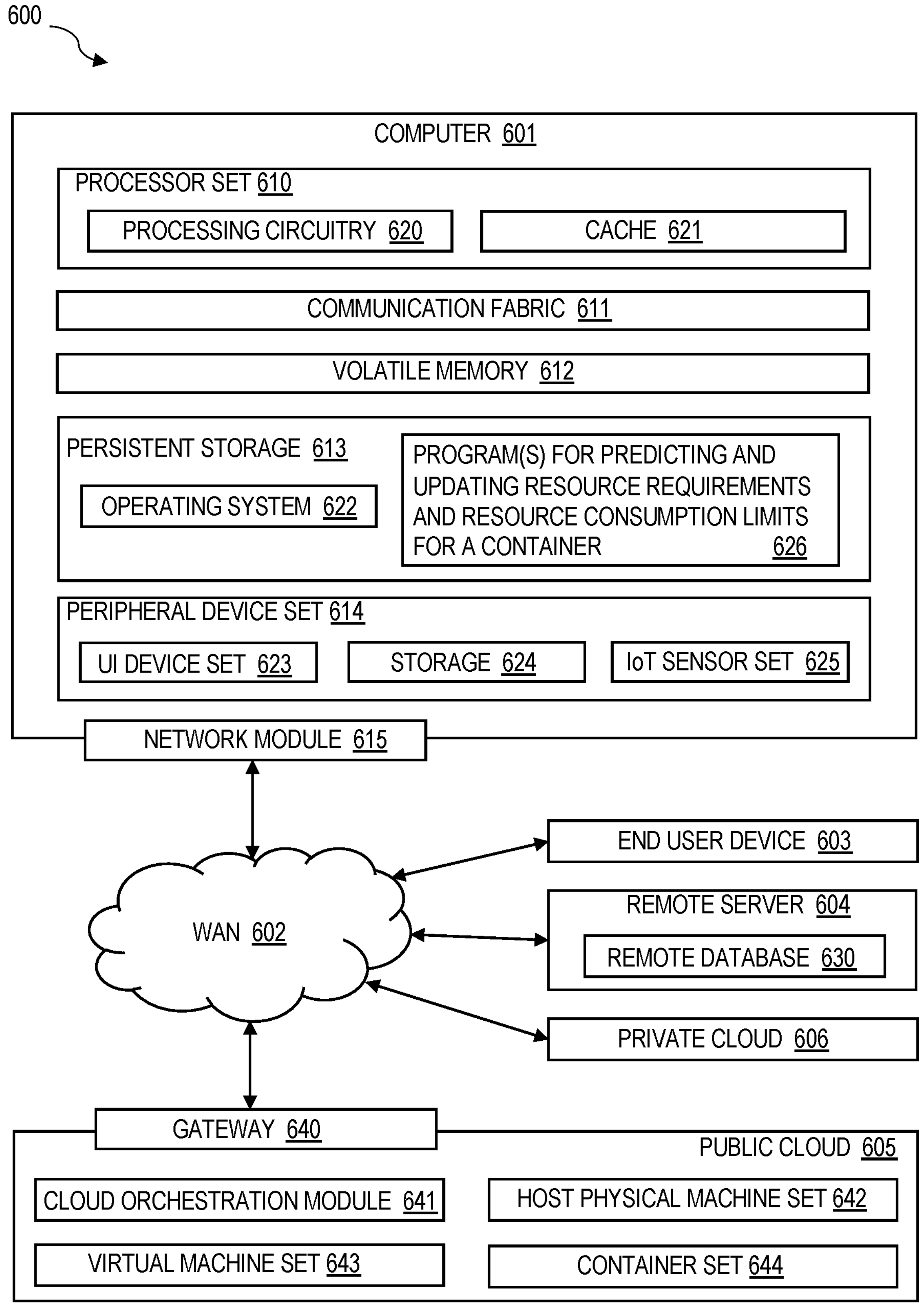
FIG. 6 is a systematic diagram illustrating an example of an environment for the execution of at least some of the computer code involved in performing global vertical auto-scaling for containers, in accordance with one embodiment of the present invention.

In FIG. 6, computing environment 600 contains an example of an environment for the execution of at least some of the computer code involved in performing the inventive methods, such as program(s) 626 for global vertical autoscaling for containers. In addition to block 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 626 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method for global vertical auto-scaling for processing units, the method comprising:

periodically learning one or more functions, based on resource consumption metrics samples of processing units;

using the one or more functions to obtain a predicted maximal resource consumption value per resource and a predicted minimal resource consumption value per resource for a processing unit;

determining a global priority of the processing unit, wherein the global priority determines a rank of the processing unit in an order of precedence for getting resources;

calculating a prioritized predicted consumption value per resource for the processing unit, based on the global priority, the predicted maximal resource consumption value, and the predicted minimal resource consumption value;

extrapolating, from the prioritized predicted consumption value, a resource requirement value per resource and a resource consumption limit value per resource for the processing unit; and feeding the resource requirement value and the resource consumption limit value to a processing unit management system.

2. The computer-implemented method of claim 1, wherein inputs for the one or more functions include one or more explaining parameters selected from the group consisting of image identification parameters, time parameters, placement parameters, network traffic parameters, and I/O (input/output) metrics parameters.

3. The computer-implemented method of claim 1, wherein the resource requirement value is higher than the prioritized predicted consumption value or equal to the prioritized predicted consumption value, wherein the resource consumption limit value is higher than or equal to the resource requirement value.

4. The computer-implemented method of claim 1, further comprising:

producing a refined resource requirement value per resource, by combining the resource requirement value with a current resource requirement value per resource assigned to the processing unit; and producing a refined resource consumption limit value per resource, by combining the resource consumption limit value with a current resource consumption limit value per resource assigned to the processing unit.

5. The computer-implemented method of claim 4, further comprising:

using a weight of the resource requirement value and a weight of the current resource requirement value, in combining the resource requirement value with the current resource requirement value;

using a weight of the resource consumption limit value and a weight of the current resource consumption limit value, in combining the resource consumption limit value with the current resource consumption limit value;

using a criterion to determine whether the refined resource requirement value and the refined resource consumption limit value are to be set for the processing unit;

wherein weights are calculated based on at least one of: a number of samples used for obtaining already assigned values, a time interval represented by the already assigned values compared with a time interval of predicted values, a difference between the already assigned values and the predicted values; and wherein the criterion is determined based on difference between refined resource requirement value and the current resource requirement value and difference between the refined resource consumption limit value and the current resource consumption limit value.

6. The computer-implemented method of claim 1, further comprising:

setting the processing unit to a pending stability state, in response to the processing unit being started;

periodically determining whether the resource consumption limit value is modified beyond a predetermined delta threshold over a last period of time for the processing unit;

in response to determining the resource consumption limit value being modified beyond the predetermined delta threshold, setting the processing unit to the pending stability state; and in response to determining the resource consumption limit value being modified not beyond the predetermined delta threshold, setting the processing unit to a stable state.

7. The computer-implemented method of claim 6, further comprising:

in response to determining the processing unit being in the pending stability state and in response to determining the processing unit exceeding any of resource consumption limit values for the resources, running the processing unit without eviction or termination of the processing unit; and in response to determining the processing unit being in the stable state and in response to determining the processing unit exceeding any of resource consumption limit values for the resources, taking an action to evict or terminate the processing unit.

8. A computer program product for global vertical autoscaling for processing units, the computer program product comprising a computer readable storage medium having program instructions embodied therewith, the program instructions executable by one or more processors, the program instructions executable to:

periodically learn one or more functions, based on resource consumption metrics samples of processing units;

use the one or more functions to obtain a predicted maximal resource consumption value per resource and a predicted minimal resource consumption value per resource for a processing unit;

determine a global priority of the processing unit, wherein the global priority determines a rank of the processing unit in an order of precedence for getting resources;

calculate a prioritized predicted consumption value per resource for the processing unit, based on the global priority, the predicted maximal resource consumption value, and the predicted minimal resource consumption value;

extrapolate, from the prioritized predicted consumption value, a resource requirement value per resource and a resource consumption limit value per resource for the processing unit; and feed the resource requirement value and the resource consumption limit value to a processing unit management system.

9. The computer program product of claim 8, wherein inputs for the one or more functions include one or more explaining parameters selected from the group consisting of image identification parameters, time parameters, placement parameters, network traffic parameters, and I/O (input/output) metrics parameters.

10. The computer program product of claim 8, wherein the resource requirement value is higher than the prioritized predicted consumption value or equal to the prioritized predicted consumption value, wherein the resource consumption limit value is higher than or equal to the resource requirement value.

11. The computer program product of claim 8, wherein the program instructions are executable to:

produce a refined resource requirement value per resource, by combining the resource requirement value with a current resource requirement value per resource assigned to the processing unit; and produce a refined resource consumption limit value per resource, by combining the resource consumption limit value with a current resource consumption limit value per resource assigned to the processing unit.

12. The computer program product of claim 11, wherein the program instructions are executable to:

use a weight of the resource requirement value and a weight of the current resource requirement value, in combining the resource requirement value with the current resource requirement value;

use a weight of the resource consumption limit value and a weight of the current resource consumption limit value, in combining the resource consumption limit value with the current resource consumption limit value;

use a criterion to determine whether the refined resource requirement value and the refined resource consumption limit value are to be set for the processing unit;

wherein weights are calculated based on at least one of: a number of samples used for obtaining already assigned values, a time interval represented by the already assigned values compared with a time interval of predicted values, a difference between the already assigned values and the predicted values; and wherein the criterion is determined based on difference between refined resource requirement value and the current resource requirement value and difference between the refined resource consumption limit value and the current resource consumption limit value.

13. The computer program product of claim 8, wherein the program instructions are executable to:

set the processing unit to a pending stability state, in response to the processing unit being started;

periodically determine whether the resource consumption limit value is modified beyond a predetermined delta threshold over a last period of time for the processing unit;

in response to determining the resource consumption limit value being modified beyond the predetermined delta threshold, set the processing unit to the pending stability state; and in response to determining the resource consumption limit value being modified not beyond the predetermined delta threshold, set the processing unit to a stable state.

14. The computer program product of claim 13, wherein the program instructions are executable to:

in response to determining the processing unit being in the pending stability state and in response to determining the processing unit exceeding any of resource consumption limit values for the resources, run the processing unit without eviction or termination of the processing unit; and in response to determining the processing unit being in the stable state and in response to determining the processing unit exceeding any of resource consumption limit values for the resources, take an action to evict or terminate the processing unit.

15. A computer system for global vertical auto-scaling for processing units, the computer system comprising one or more processors, one or more computer readable tangible storage devices, and program instructions stored on at least one of the one or more computer readable tangible storage devices for execution by at least one of the one or more processors, the program instructions executable to:

periodically learn one or more functions, based on resource consumption metrics samples of processing units;

use the one or more functions to obtain a predicted maximal resource consumption value per resource and a predicted minimal resource consumption value per resource for a processing unit;

determine a global priority of the processing unit, wherein the global priority determines a rank of the processing unit in an order of precedence for getting resources;

calculate a prioritized predicted consumption value per resource for the processing unit, based on the global priority, the predicted maximal resource consumption value, and the predicted minimal resource consumption value;

extrapolate, from the prioritized predicted consumption value, a resource requirement value per resource and a resource consumption limit value per resource for the processing unit; and feed the resource requirement value and the resource consumption limit value to a processing unit management system.

16. The computer system of claim 15, wherein inputs for the one or more functions include explaining parameters selected from the group consisting of image identification parameters, time parameters, placement parameters, network traffic parameters, and I/O (input/output) metrics parameters.

17. The computer system of claim 15, wherein the resource requirement value is higher than the prioritized predicted consumption value or equal to the prioritized predicted consumption value, wherein the resource consumption limit value is higher than or equal to the resource requirement value.

18. The computer system of claim 15, wherein the program instructions are executable to:

produce a refined resource requirement value per resource, by combining the resource requirement value with a current resource requirement value per resource assigned to the processing unit; and produce a refined resource consumption limit value per resource, by combining the resource consumption limit value with a current resource consumption limit value per resource assigned to the processing unit.

19. The computer system of claim 18, wherein the program instructions are executable to:

use a weight of the resource requirement value and a weight of the current resource requirement value, in combining the resource requirement value with the current resource requirement value;

use a weight of the resource consumption limit value and a weight of the current resource consumption limit value, in combining the resource consumption limit value with the current resource consumption limit value;

use a criterion to determine whether the refined resource requirement value and the refined resource consumption limit value are to be set for the processing unit;

wherein weights are calculated based on at least one of: a number of samples used for obtaining already assigned values, a time interval represented by the already assigned values compared with a time interval of predicted values, a difference between the already assigned values and the predicted values; and wherein the criterion is determined based on difference between refined resource requirement value and the current resource requirement value and difference between the refined resource consumption limit value and the current resource consumption limit value.

20. The computer system of claim 18, wherein the program instructions are executable to:

set the processing unit to a pending stability state, in response to the processing unit being started;

periodically determine whether the resource consumption limit value is modified beyond a predetermined delta threshold over a last period of time for the processing unit;

in response to determining the resource consumption limit value being modified beyond the predetermined delta threshold, set the processing unit to the pending stability state;

in response to determining the resource consumption limit value being modified not beyond the predetermined delta threshold, set the processing unit to a stable state;

in response to determining the processing unit being in the pending stability state and in response to determining the processing unit exceeding any of resource consumption limit values for the resources, run the processing unit without eviction or termination of the processing unit; and in response to determining the processing unit being in the stable state and in response to determining the processing unit exceeding any of resource consumption limit values for the resources, take an action to evict or terminate the processing unit.

* * * * *